United States Patent
Jeong et al.

(10) Patent No.: US 8,212,487 B2
(45) Date of Patent: Jul. 3, 2012

(54) FIELD EMISSION DEVICE AND METHOD OF OPERATING THE SAME

(75) Inventors: Jin Woo Jeong, Daejeon (KR); Yoon Ho Song, Daejeon (KR); Jae Woo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 12/841,570

(22) Filed: Jul. 22, 2010

(65) Prior Publication Data

US 2011/0074309 A1 Mar. 31, 2011

(30) Foreign Application Priority Data

Sep. 25, 2009 (KR) .................. 10-2009-0090793
May 3, 2010 (KR) .................. 10-2010-0041309

(51) Int. Cl.
*G09G 3/10* (2006.01)
*H05B 37/00* (2006.01)

(52) U.S. Cl. .................. 315/169.3; 345/75.2

(58) Field of Classification Search .................. 315/167, 315/169.1, 169.3; 345/74.1, 75.2
See application file for complete search history.

(56) References Cited

U.S. PATENT DOCUMENTS

| | | | | |
|---|---|---|---|---|
| 6,031,336 | A | * | 2/2000 | Rumbaugh et al. ........ 315/169.3 |
| 7,492,335 | B2 | * | 2/2009 | Johnson ........................ 345/75.2 |
| 2007/0273617 | A1 | | 11/2007 | Yamakawa |

FOREIGN PATENT DOCUMENTS

| | | |
|---|---|---|
| JP | 2006-286565 A | 10/2006 |
| KR | 2008-0017241 A | 2/2008 |
| WO | WO-9924961 A1 | 5/1999 |

* cited by examiner

*Primary Examiner* — Don Le
(74) *Attorney, Agent, or Firm* — Rabin & Berdo, P.C.

(57) ABSTRACT

Provided are a field emission device enabling rapid pulse operation and a method of operating the same. The field emission device includes a cathode electrode including a field emission source, an anode electrode disposed to face the cathode electrode and accelerating electrons emitted from the field emission source, a current controller controlling field emission current flowing through the cathode electrode, and a field emission controller applying a pull-up voltage to the cathode electrode when the current controller is turned off.

11 Claims, 7 Drawing Sheets

FIG. 6

FIELD EMISSION DEVICE AND METHOD OF OPERATING THE SAME

CROSS-REFERENCE TO RELATED APPLICATION

This application claims priority to and the benefit of Korean Patent Application Nos. 10-2009-0090793 filed Sep. 25, 2009, and 10-2010-0041309 filed May 3, 2010, the disclosure of which is incorporated herein by reference in its entirety.

BACKGROUND

1. Field of the Invention

The present invention relates to a field emission device and a method of operating the same, and more particularly, to a field emission device enabling rapid pulse operation and a method of operating the same.

2. Discussion of Related Art

A field emission device emits electrons from a cathode electrode by applying an electric field in a vacuum atmosphere, and is used as a field emission display (FED), a field emission lamp (FEL), a field emission X-ray, etc.

Such field emission devices are classified into diode field emission devices composed of a cathode electrode and an anode electrode and triode field emission devices composed of a cathode electrode, an anode electrode and a gate electrode. Here, the diode field emission device emits electrons due to a voltage difference between the cathode electrode and the anode electrode, whereas the triode field emission device emits electrons due to induction by the gate electrode.

Hereinafter, the structure and operating method of a conventional field emission device will be described with reference to the drawings.

Figure 1:
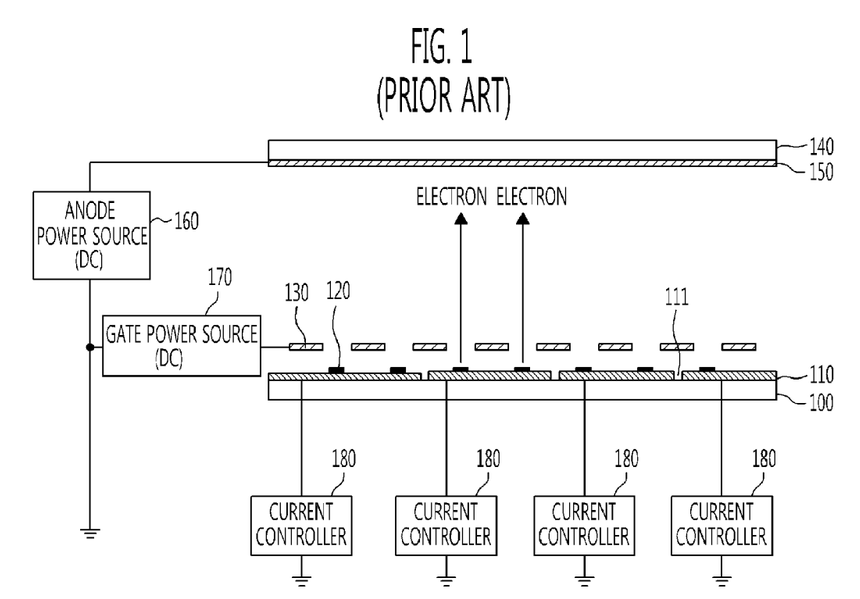
FIG. 1 is a diagram showing a structure of a conventional field emission device.

FIG. 1 is a diagram showing a structure of a conventional field emission device, particularly, a triode field emission device.

As shown in FIG. 1, the conventional triode field emission device includes a lower substrate 100, and a cathode electrode 110 formed on the lower substrate 100 and including a plurality of field emission sources 120. Here, the cathode electrode 110 has a gap 111 to insulate pixels or blocks from each other. A gate electrode 130 is provided on the cathode electrode 110 to induce field emission, and an insulating layer or spacer (not shown) is interposed between the cathode electrode 110 and the gate electrode 130.

Further, an upper substrate 140 disposed parallel to the lower substrate 100 and an anode electrode 150 formed on a bottom surface of the upper substrate 140 to face the cathode electrode 110 are provided.

An anode power source 160 providing a DC voltage to the anode electrode 150 and a gate power source 170 providing a DC voltage to the gate electrode 130 are also provided.

A current controller 180 controlling field emission current flowing through the cathode electrode 110 is provided, which may be implemented using a MOSFET.

In the field emission device having such a structure, the gate electrode 130 induces electron emission from the field emission source 120, and the emitted electrons are accelerated in a direction of the anode electrode 150. Particularly, the field emission device is operated by a current driving method, which will be described in detail below.

The field emission device is operated by a current driving method in which the current controller 180 controls field emission current flowing through the cathode electrode 110 so that field emission occurs in a specific pixel or block, in a state in which a uniform DC voltage is applied to the anode electrode 150 and the gate electrode 130 by the anode power source 160 and the gate power source 170.

Specifically, when the current controller 180 is turned on, the cathode electrode 110 is grounded (0 V), a sufficient voltage for field emission is applied to both ends of the gate electrode 130 and the cathode electrode 110, and thus the field emission occurs in a corresponding pixel or block.

When the current controller 180 is turned off, the cathode electrode 110 is electrically separated from the grounded electrode, and thus electrons remaining in the cathode electrode 110 are emitted. Accordingly, a positive potential of the cathode electrode 110 is increased, the field emission is interrupted due to a decreased voltage between the gate electrode 130 and the cathode electrode 110, and an increase in potential of the cathode electrode 110 is stopped.

Such a current driving method may control field emission using a low signal source of 5 V or less capable of turning on/off a MOSFET used as a device for the current controller 180.

Figure 2:
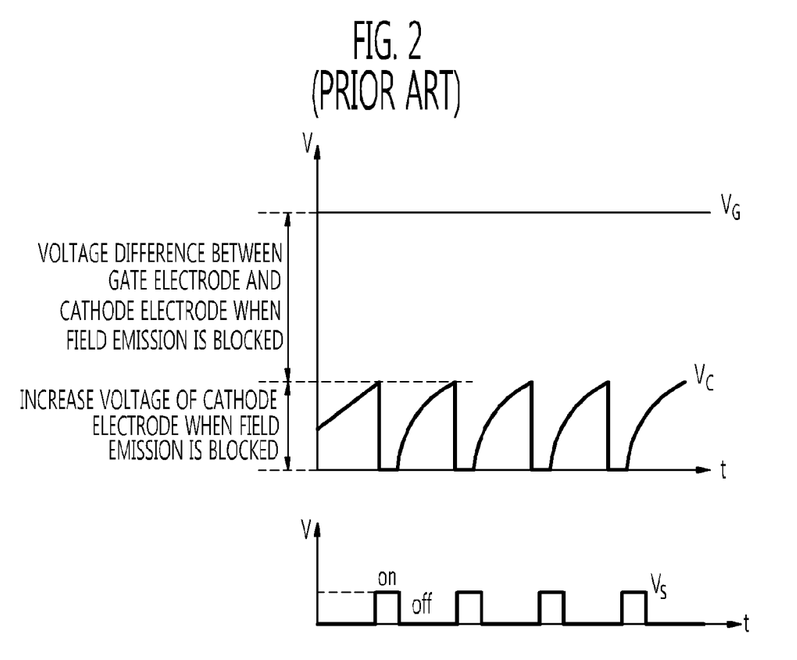
FIG. 2 is a timing diagram showing a change in voltage of each electrode during operation of the conventional field emission device.

FIG. 2 is a timing diagram showing a change in voltage of each electrode during operation of the conventional field emission device. A top graph shows level changes in voltage (Vg) of a gate electrode and a voltage (Vc) of a cathode electrode according to time, and a bottom graph shows a signal pulse (Vs) applied to a current controller, i.e., a gate terminal of the MOSFET. Here, in each graph, the X axis represents time, and the Y axis represents voltage.

As shown in the graphs, when a DC voltage (Vg) is applied to the gate electrode 130, the current controller 180 is turned on/off according to a signal pulse applied thereto.

When the current controller 180 is turned on by applying a high level of pulse, the cathode electrode 110 is grounded and thus electrons are emitted from the field emission source 120. When the current controller 180 is turned off by applying a low level of pulse, the cathode electrode 110 is separated from the grounded electrode so as to increase a voltage, and thus the field emission is interrupted.

While the voltage (Vc) of the cathode electrode is vertically dropped at the time when the current controller 180 is turned on, that is, at a rising edge of the signal pulse (Vs), the voltage of the cathode electrode 110 is gradually increased in a parabolic shape at the time when the current controller 180 is turned off, that is, at a falling edge of the signal pulse (Vs). In other words, since the field emission current cannot be immediately blocked even though the current controller 180 is turned off, it is difficult to implement rapid pulse driving.

SUMMARY OF THE INVENTION

The present invention is directed to a field emission device operated in a current driving method and enabling rapid pulse operation.

The present invention is also directed to a method of operating a field emission device enabling rapid pulse operation in a current driving method.

One aspect of the present invention provides a field emission device, which includes: a cathode electrode including a field emission source; an anode electrode disposed to face the cathode electrode and accelerating electrons emitted from the field emission source; a current controller controlling field emission current flowing through the cathode electrode; and a field emission controller applying a pull-up voltage to the cathode electrode when the current controller is turned off.

Another aspect of the present invention provides a method of operating a field emission device, which includes: applying a DC voltage to an anode electrode; grounding a cathode electrode disposed to face the anode electrode and including a field emission source, and emitting an electron from the field emission source; separating the cathode electrode from the grounded electrode; and applying a pull-up voltage to the cathode electrode separated from the grounded electrode.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, the present invention will be described with reference to the accompanying drawings in detail. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification. In the drawings, the thickness of layers and regions are exaggerated for clarity.

Throughout the specification, when a part "includes" an element, the part may include, not remove, another element, unless otherwise defined.

Figure 3:
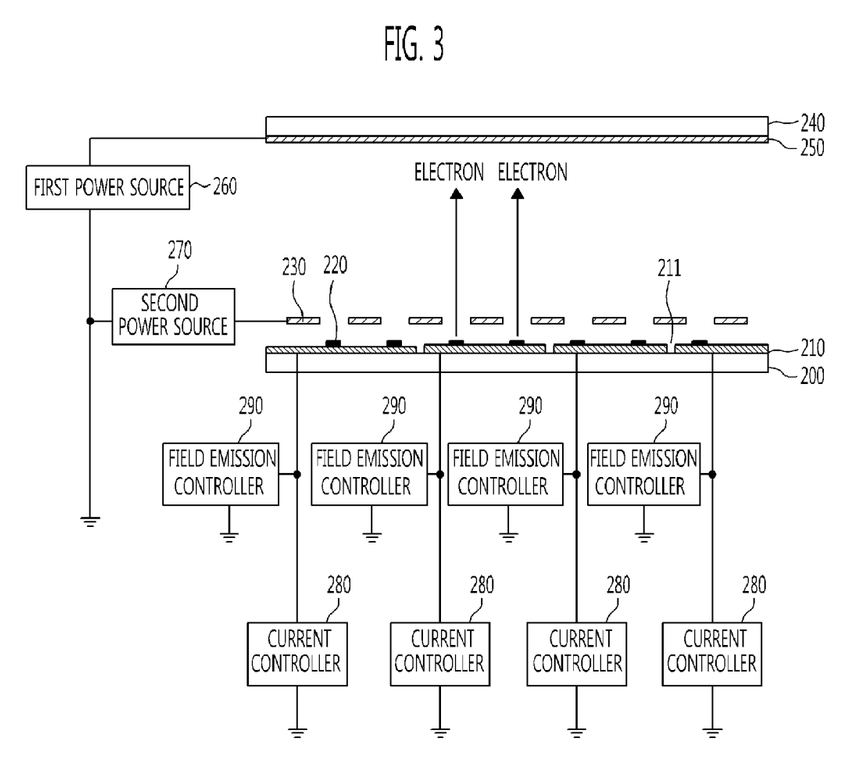
FIG. 3 is a diagram showing a structure of a field emission device according to an exemplary embodiment of the present invention.

FIG. 3 is a diagram showing a structure of a field emission device according to an exemplary embodiment of the present invention, and particularly shows a structure of a triode field emission device. For clarity, the following description will focus on electrodes, disregarding insulating layers, and so on.

As shown in FIG. 3, a field emission device according to the exemplary embodiment of the present invention includes a cathode electrode 210 including a field emission source 220, an anode electrode 250 disposed to face the cathode electrode 210 to accelerate electrons emitted from the field emission source 220, a gate electrode 230 inducing electron emission from the field emission source 220, a current controller 280 controlling field emission current flowing through the cathode electrode 210, and a field emission controller 290 applying a pull-up voltage to the cathode electrode 210 when the current controller 280 is turned off.

The field emission device may further include a first power source 260 providing a high level of DC voltage to the anode electrode 250 and a second power source 270 providing a high level of DC voltage to the gate electrode 230.

The cathode electrode 210 is formed on a lower substrate 200. The cathode electrode 210 includes a plurality of field emission sources 220, which may have gaps 211 to insulate pixels or blocks from each other.

The field emission source 220 emits electrons, and projects from a surface of the cathode electrode 210. The field emission source 220 emits electrons when a voltage difference between the cathode electrode 210 and the gate electrode 230 is greater than a threshold voltage.

The anode electrode 250 is formed on a bottom surface of an upper substrate 240 disposed parallel to the lower substrate 200.

The gate electrode 230 is formed on the cathode electrode 210, and an insulating layer or spacer (not shown) is interposed between the cathode electrode 210 and the gate electrode 230.

The current controller 280 is connected between the cathode electrode 210 and a grounded electrode, and may be implemented using a MOSFET. The current controller 280 connects the cathode electrode 210 with the ground electrode during turn-on, or separates the cathode electrode 210 from the ground electrode during turn-off.

The field emission controller 290 immediately increases a voltage of the cathode electrode 210 when the current controller 280 is turned off so as to enable rapid pulse driving. The field emission controller 290 is connected to the cathode electrode 210, and may be connected between the cathode electrode 210 and the current controller 280.

Here, the current emission controller 290 applies a pull-up voltage to rapidly increase a potential of the cathode electrode when the current controller 280 is turned off. Accordingly, as the pull-up voltage is applied, the potential of the cathode electrode 210 may be increased to allow the voltage difference between the cathode electrode 210 and the gate electrode 230 to be the same as or lower than the threshold voltage.

Here, the pull-up voltage may be a predetermined level of DC voltage. The pull-up voltage applied to the cathode electrode 210 may be the same as or different from the DC voltage applied to the anode electrode 250 and the gate electrode 230 if necessary.

In addition, a pulse-type pull-up voltage may be applied to the cathode electrode 210.

Figure 4:
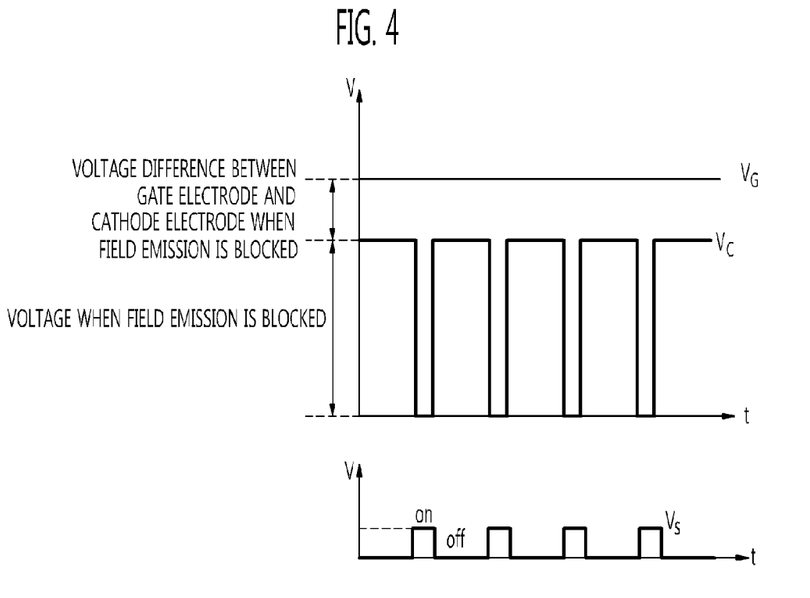
FIG. 4 is a timing diagram showing a change in voltage of each electrode during operation of the field emission device according to the exemplary embodiment of the present invention.

FIG. 4 is a timing diagram showing a change in voltage of each electrode during operation of the field emission device according to the exemplary embodiment of the present invention. A top graph shows a level change in voltage (Vg) of the gate electrode and a level change in voltage (Vc) of the cathode electrode according to time, and a bottom graph shows a signal pulse (Vs) applied to the current controller. In each graph, the X axis represents time, and the Y axis represents voltage.

As shown in these graphs, when the DC voltage (Vg) is applied to the gate electrode 230, the current controller 280 is turned on/off in response to the signal pulse (Vs) applied to the current controller 280.

When the current controller 280 is turned on by applying a high level of signal pulse (Vs), the cathode electrode 210 is grounded, and electrons are emitted from the field emission source 220. When the current controller 280 is turned off by applying a low level of signal pulse (Vs), the cathode electrode 210 is separated from the grounded electrode, and a pull-up voltage is applied to the cathode electrode 210 due to the field emission controller 290. Here, since the pull-up voltage is applied to the cathode electrode 210 at a falling edge of the signal pulse (Vs), a voltage of the cathode electrode 210 is vertically increased at the falling edge of the signal pulse (Vs). Thus, the voltage of the cathode electrode 210 is rapidly increased, and the field emission is immediately interrupted.

In other words, according to the present invention, as the voltage of the cathode electrode 210 is rapidly increased during the turn-off of the current controller 280, the field emission at the cathode electrode 210 is abruptly increased, and thus the field emission device may be rapidly operated in a current driving method.

Figure 5A:
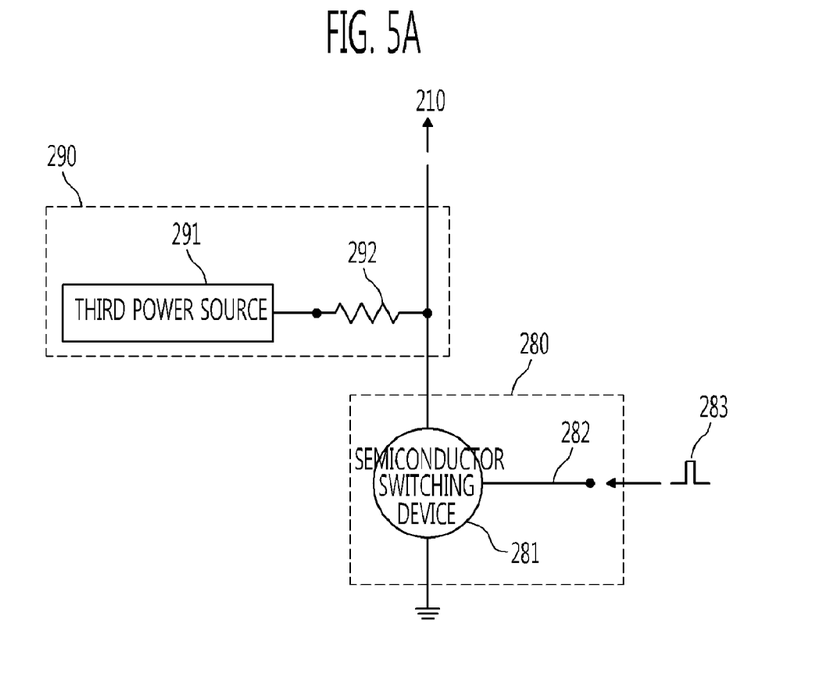
FIG. 5A is a diagram showing structures of a field emission controller and a current controller according to a first exemplary embodiment of the present invention.

FIG. 5A is a diagram showing structures of a field emission controller and a current controller according to a first exemplary embodiment of the present invention.

As shown in FIG. 5A, the field emission controller 290 includes a third power source 291 generating a pull-up voltage to be provided to the cathode electrode 210, and a resistor 292 connected between the third power source 291 and the cathode electrode 210. The current controller 280 includes a semiconductor switching device 281 and current is switched due to a signal pulse 283 applied through one terminal 282.

Here, the third power source 291 may generate a uniform DC voltage according to time as a pull-up voltage. The semiconductor switching device 281 may be a MOSFET device.

The operation of the field emission device including the field emission controller 290 and the current controller 280 having such structures will be described.

When the semiconductor switching device 281 is turned on, the cathode electrode 210 is connected with a grounded electrode, and a voltage difference between the cathode electrode 210 and the gate electrode 230 is greater than a threshold voltage of the field emission source 220, and thus electrons are emitted from the field emission source 220. Here, the pull-up voltage generated by the third power source 291, i.e., a DC voltage, is applied to the resistor 292.

When the semiconductor switching device 281 is turned off, the cathode electrode 210 is separated from the grounded electrode, and the DC voltage generated by the third power source 291 is applied to the cathode electrode 210. Here, since a voltage drop caused by the resistor 292 is negligible, the cathode electrode 210 is immediately increased up to the level of the DC voltage generated by the third power source 291. That is, the field emission blocking voltage has substantially the same value as the DC voltage generated by the third power source 291 of the field emission controller 290. Thus, the third power source 291 may determine a potential level of the pull-up voltage to prevent the field emission by sufficiently increasing the voltage of the cathode electrode 210 and thereby reducing the voltage difference between the gate electrode 230 and the cathode electrode 210. In other words, to completely block field emission current flowing through the cathode electrode 210, the level of the DC voltage generated from the third power source 291 needs to be determined for the voltage difference between the cathode electrode 210 and the gate electrode 230 to have a value the same as or lower than a threshold voltage of the field emission source 220. Here, the third power source 291 may be a second power source 270 as a gate power source.

Figure 5B:
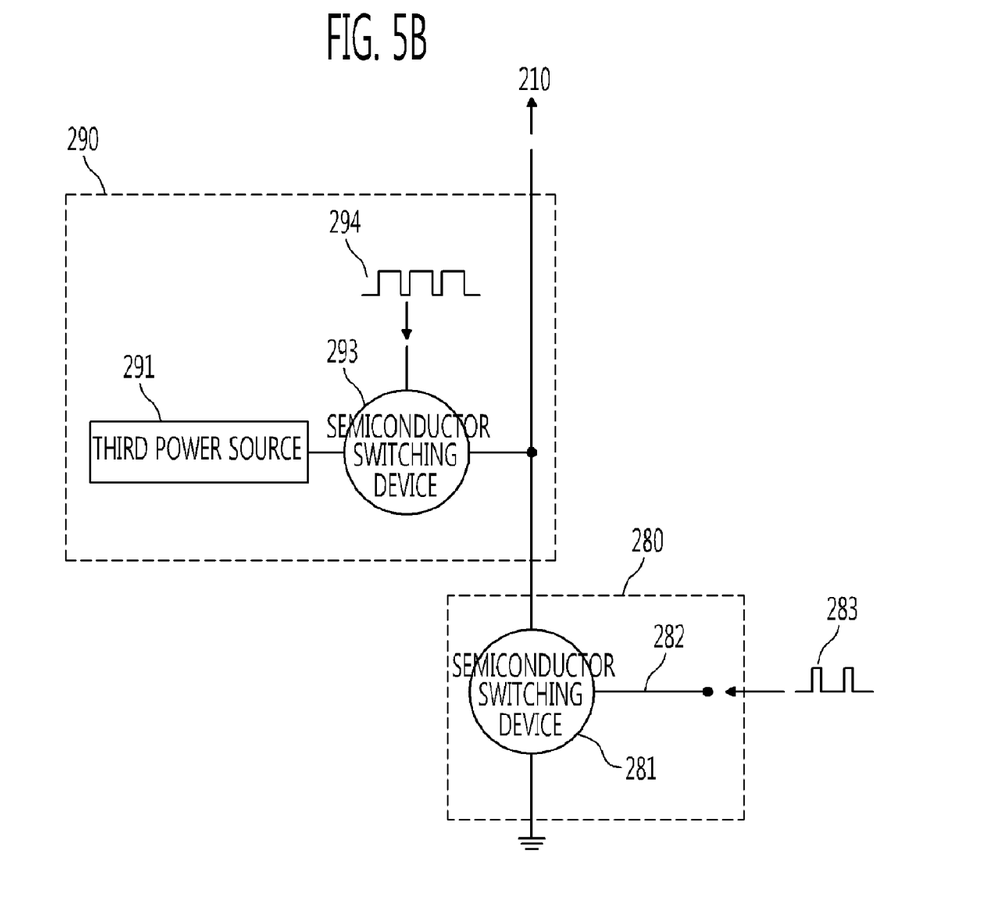
FIG. 5B is a diagram showing a structure of a field emission controller according to a second exemplary embodiment of the present invention.

FIG. 5B is a diagram showing a structure of a field emission controller according to a second exemplary embodiment of the present invention.

As shown in FIG. 5B, the field emission controller 290 includes a third power source 291 generating a pull-up voltage to be provided to the cathode electrode 210 and a semiconductor switching device 293 connected between the third power source 291 and the cathode electrode 210.

Here, the third power source 291 may generate a uniform DC voltage according to time as a pull-up voltage. The semiconductor switching device 293 may also be a MOSFET device and may be turned on/off by applied signal pulse 294. Here, the signal pulse 294 applied to the semiconductor switching device 293 of the field emission controller 290 may be a pulse in which the signal pulse 283 applied to the semiconductor switching device 281 of the current controller 280 is reversed, which may be implemented by a reversed circuit.

Thus, the field emission controller 290 blocks connection between the third power source 291 and the cathode electrode 210 when the current controller 280 is turned on, and connects the third power source 291 with the cathode electrode 210 when the current controller 280 is turned off.

The operation of the field emission device including the field emission controller 290 and the current controller 280 having such structures will now be described.

When the semiconductor switching device 281 of the current controller 280 is turned on, the semiconductor switching device 293 of the field emission controller 290 is turned off, and thus the connection between the third power source 291 and the cathode electrode 210 is blocked.

When the semiconductor switching device 281 of the current controller 280 is turned off, the semiconductor switching device 293 of the field emission controller 290 is turned on, and thus the third power source 291 is connected with the cathode electrode 210.

As described above, as the resistor 292 according to the first exemplary embodiment is replaced with a semiconductor switching device 293, the flow of current through the resistor 292 from the third power source 291 may be prevented when the current controller 280 is turned on. That is, the unnecessary loss of power may be prevented by blocking leakage current. Here, when the semiconductor switching device 293 is turned on, a terminal of the MOSFET connected with the cathode electrode 210 is increased by the third power source 291. Accordingly, to keep the MOSFET turn-on, a voltage between gate-source terminals of the MOSFET needs to be maintained greater than a predetermined voltage.

Figure 6:
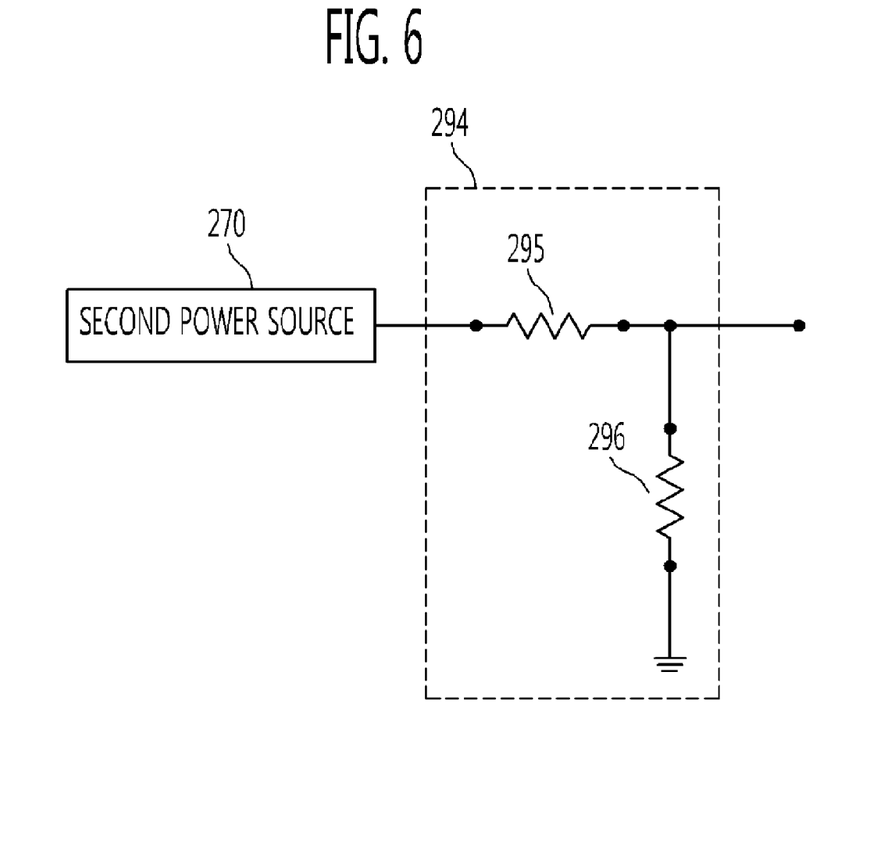
FIG. 6 is a diagram showing a structure of a power source of a field emission controller according to an exemplary embodiment of the present invention.

FIG. 6 is a diagram showing a structure of a power source of a field emission controller according to an exemplary embodiment of the present invention.

While FIGS. 5A and 5B show a case in which a separate third power source 291 is included in the field emission controller 290, in this embodiment, the field emission controller 290 includes a conventional power source without the separate third power source 291.

As shown in FIG. 6, the field emission controller 290 includes a voltage divider 294 to divide a voltage generated from the conventional power source. The voltage divider 294 may include resistors 295 and 296, which are connected in parallel. According to FIG. 6, a voltage generated from the second power source 270 is divided. Otherwise, a conventional power source such as the first power source 260 may be used.

As described above, the field emission controller 290 may generate a pull-up voltage required from the field emission controller 290 by dividing the voltage generated from the second power source 270 by the voltage divider 294.

This embodiment may be applied to the power sources 291 according to the first and second exemplary embodiments described above. Unlike the second exemplary embodiment in which the leakage current is blocked using the semiconductor switching device 293, the voltage divider 294 may have sufficiently large resistors 295 and 296 to minimize the unnecessary current loss when being applied to the first exemplary embodiment. However, when the resistance value is very high, a response time may be reduced, and thus the resistance value may be appropriately selected according to the characteristic of the device.

As described above, in the case of using the voltage divider 294, it is not necessary to include a separate power source, and thus the area of the device and the production cost may be reduced.

FIGS. 5A to 6 show a case in which a DC voltage is used as a pull-up voltage with reference to the exemplary embodiment of the present invention. However, it is provided for clarity, not to limit the present invention. In addition, the present invention may abruptly increase the voltage of the cathode electrode using a pulse-type of pull-up voltage, and the field emission controller may include a pulse generator.

Throughout the specification, the structure and operating method for the triode field emission device have been described. However, these are provided for clarity, not to limit the present invention. The present invention may be also applied to a different type of triode or diode field emission device and an operating method thereof.

The diode field emission device includes a cathode electrode and an anode electrode disposed to face the cathode electrode so as to induce and accelerate electrons emitted from a field emission source. When the voltage difference between the cathode electrode and the anode electrode is greater than a threshold voltage of the field emission source, electrons are emitted from the field emission source.

Specifically, when a current controller is turned on, the cathode electrode is connected with a grounded electrode, and thus electrons are emitted due to the voltage difference between the cathode electrode and the anode electrode.

When the current controller is turned off, the cathode electrode is separated from the grounded electrode, and thus the field emission controller applies a pull-up voltage to the cathode electrode. That is, the field emission controller rapidly increases the voltage of the cathode electrode such that the voltage difference between the cathode electrode and the anode electrode is the same as or lower than the threshold voltage of the field emission source, thereby blocking the field emission.

The field emission device according to an exemplary embodiment of the present invention may be used as a field emission lamp applied to a back light unit (BLU) of a liquid crystal display (LCD), a color sequential LCD, a BLU of an LED, or an X-ray electron source.

According to the present invention, as a pull-up voltage is applied to a cathode electrode when a current controller is turned off, a potential of the cathode electrode can be rapidly increased. Thus, a field emission device capable of being rapidly operated in a pulse-type current driving method and an operating method thereof can be provided.

Particularly, when a field emission lamp implemented using such a field emission device is applied to a BLU of an LCD, afterimages generated in motion pictures can be removed. Further, when such a field emission device is applied to a BLU of a color sequential LCD or a light emitting device (LED), a color breaking phenomenon exhibited in the BLU of the LCD or LED is removed, and thus the performance of the device can be improved. Furthermore, when such a field emission device is applied as an X-ray electron source, rapid X-ray pulse can be generated, which is impossible in a conventional thermal electron source.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A field emission device, comprising:
a cathode electrode including a field emission source;
an anode electrode disposed to face the cathode electrode and accelerating electrons emitted from the field emission source;
a current controller controlling field emission current flowing through the cathode electrode; and
a field emission controller applying a pull-up voltage to the cathode electrode when the current controller is turned off.

2. The device according to claim 1, wherein the field emission controller increases the voltage of the cathode electrode such that a voltage difference between the cathode electrode and the anode electrode has a value equal to or lower than a threshold voltage of the field emission source.

3. The device according to claim 1, further comprising a gate electrode inducing electron emission from the field emission source,
wherein the field emission controller increases the voltage of the cathode electrode such that a voltage difference between the gate electrode and the cathode electrode has a value equal to or lower than a threshold voltage of the field emission source.

4. The device according to claim 1, wherein the field emission controller is connected between the cathode electrode and the current controller.

5. The device according to claim 1, wherein the cathode electrode is connected with a grounded electrode when the current controller is turned on, and separated from the grounded electrode when the current controller is turned off.

6. The device according to claim 1, wherein the field emission controller includes:
a power source generating a pull-up voltage to be provided to the cathode electrode; and
a resistor connected between the power source and the cathode electrode.

7. The device according to claim 1, wherein the field emission controller includes:
a power source generating a pull-up voltage to be provided to the cathode electrode; and
a switching part blocking the connection between the power source and the cathode electrode when the current controller is turned on, and connecting the power source with the cathode electrode when the current controller is turned off.

8. The device according to claim 6, further comprising a gate electrode inducing electron emission from the field emission source,
wherein the power source provides a DC voltage to the gate electrode and the cathode electrode, the DC voltage applied to the gate electron being divided and provided to the cathode electrode.

9. A method of operating a field emission device, comprising:
applying a DC voltage to an anode electrode;
grounding a cathode electrode disposed to face the anode electrode and including a field emission source, and emitting an electron from the field emission source;
separating the cathode electrode from the grounded electrode; and applying a pull-up voltage to the cathode electrode separated from the grounded electrode.

10. The method according to claim 9, wherein applying the pull-up voltage to the cathode electrode includes increasing the voltage of the cathode electrode such that a voltage difference between the cathode electrode and the anode electrode has a value equal to or lower than a threshold voltage of the field emission source.

11. The method according to claim 9, further comprising applying a DC voltage to a gate electrode inducing electron emission from the field emission source before the electron emission,
wherein applying the pull-up voltage to the cathode electrode includes increasing the voltage of the cathode electrode such that a voltage difference between the gate electrode and the cathode electrode has a value equal to or lower than a threshold voltage of the field emission source.

* * * * *